United States Patent
Wang et al.

(10) Patent No.: US 8,116,925 B2
(45) Date of Patent: Feb. 14, 2012

(54) DYNAMIC HYSTERESIS EVALUATION METHOD FOR HYBRID VEHICLES BASED ON OPTIMAL POWER LOSS CONTROL STRATEGY

(75) Inventors: Jian M Wang, Ann Arbor, MI (US);
Eric M. Rask, Royal Oak, MI (US);
Chihang Lin, Ann Arbor, MI (US)

(73) Assignee: GM Global Technology Operations LLC

( * ) Notice: Subject to any disclaimer, the term of this patent is extended or adjusted under 35 U.S.C. 154(b) by 537 days.

(21) Appl. No.: 12/391,530

(22) Filed: Feb. 24, 2009

(65) Prior Publication Data

US 2010/0217464 A1     Aug. 26, 2010

(51) Int. Cl.
*B60K 6/20* (2007.10)
*B60W 20/00* (2006.01)
*G06F 17/00* (2006.01)

(52) U.S. Cl. .......................................... 701/22; 180/65.8

(58) Field of Classification Search .................. None
See application file for complete search history.

(56) References Cited

U.S. PATENT DOCUMENTS

2007/0032926 A1*  2/2007  Kozarekar et al. ............. 701/22
2007/0093953 A1*  4/2007  Heap et al. .................... 701/103

* cited by examiner

*Primary Examiner* — Michael J. Zanelli (57) ABSTRACT

A hybrid control system comprises a power loss (PL) determination module, a hysteresis estimation module, and a mode determination module. The PL determination module determines a power loss of a hybrid drivetrain based on an engine speed, a motor speed, and a vehicle speed. The hysteresis estimation module determines an average power loss of the hybrid drivetrain based on the power loss and determines a hysteresis power loss of the hybrid drivetrain based on the average power loss. The mode determination module selects an operation mode of the hybrid drivetrain based on the hysteresis power loss. The hybrid control system controls the hybrid drivetrain based on the operation mode.

19 Claims, 7 Drawing Sheets

DYNAMIC HYSTERESIS EVALUATION METHOD FOR HYBRID VEHICLES BASED ON OPTIMAL POWER LOSS CONTROL STRATEGY

FIELD

The present disclosure relates to hybrid control systems and more particularly to hysteresis evaluation methods and systems in a hybrid control system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As an alternative to the internal combustion engine, automotive manufacturers have developed hybrid drivetrains that include both an electric motor and an internal combustion engine. During operation, vehicles including the hybrid drivetrain use one or both of the power sources to improve efficiency. Hybrid vehicles include one of a parallel drivetrain configuration, a series drivetrain configuration, and a combined drivetrain configuration.

In a parallel hybrid vehicle, the electric motor works in parallel with the engine to combine the power and the range advantages of the engine with the efficiency and the electrical regeneration capability of the electric motor. In a series hybrid vehicle, the engine drives a generator to produce electricity for the electric motor, which drives a transmission. This allows the electric motor to assume some of the power responsibilities of the engine, thereby permitting the use of a smaller and more efficient engine.

In a combined hybrid vehicle, the power paths from the engine to the transmission may be either mechanical or electrical. Additionally, for all described hybrid configurations, the engine may be turned off while the vehicle is stopped and a brake pedal is pressed to conserve fuel. Increasing the duration of engine stoppage while the vehicle is at rest increases the hybrid fuel economy benefit.

The hybrid drivetrain may operate in various modes. Operating modes may include a mode where both the engine and the electrical motor drive the transmission. Operating modes may further include a mode where only the electric motor drives the transmission and a mode where the electric motor charges an associated battery.

A conventional hybrid control system determines the operating mode of the hybrid drivetrain based on a power loss of the hybrid drivetrain. The power loss is a total amount of power lost by components of the hybrid drivetrain (e.g., the engine, the motor, the transmission) via, for example, friction and/or heat. While this approach has a positive impact on the fuel economy of the vehicle, drivability of the vehicle may be adversely affected. For example, volatile power loss may cause excessive shifts in the operation mode.

SUMMARY

A hybrid control system comprises a power loss (PL) determination module, a hysteresis estimation module, and a mode determination module. The PL determination module determines a power loss of a hybrid drivetrain based on an engine speed, a motor speed, and a vehicle speed. The hysteresis estimation module determines an average power loss of the hybrid drivetrain based on the power loss and determines a hysteresis power loss of the hybrid drivetrain based on the average power loss. The mode determination module selects an operation mode of the hybrid drivetrain based on the hysteresis power loss. The hybrid control system controls the hybrid drivetrain based on the operation mode.

A method of operating a hybrid control system comprises determining a power loss of a hybrid drivetrain based on an engine speed, a motor speed, and a vehicle speed; determining an average power loss of the hybrid drivetrain based on the power loss; determining a hysteresis power loss of the hybrid drivetrain based on the average power loss; selecting an operation mode of the hybrid drivetrain based on the hysteresis power loss; and controlling the hybrid drivetrain based on the operation mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To improve the drivability and the fuel economy of a conventional hybrid drivetrain, the hybrid control system of the present disclosure includes hysteresis (i.e., historical) evaluation methods and systems. The hysteresis evaluation methods and systems determine a hysteresis value of a power loss of a hybrid drivetrain based on the power loss. In addition, the hysteresis evaluation methods and systems filter the noise of the power loss signal and are easy to calibrate. The hybrid control system determines an operating mode of the hybrid drivetrain based on the power loss and the hysteresis value.

Figure 1:
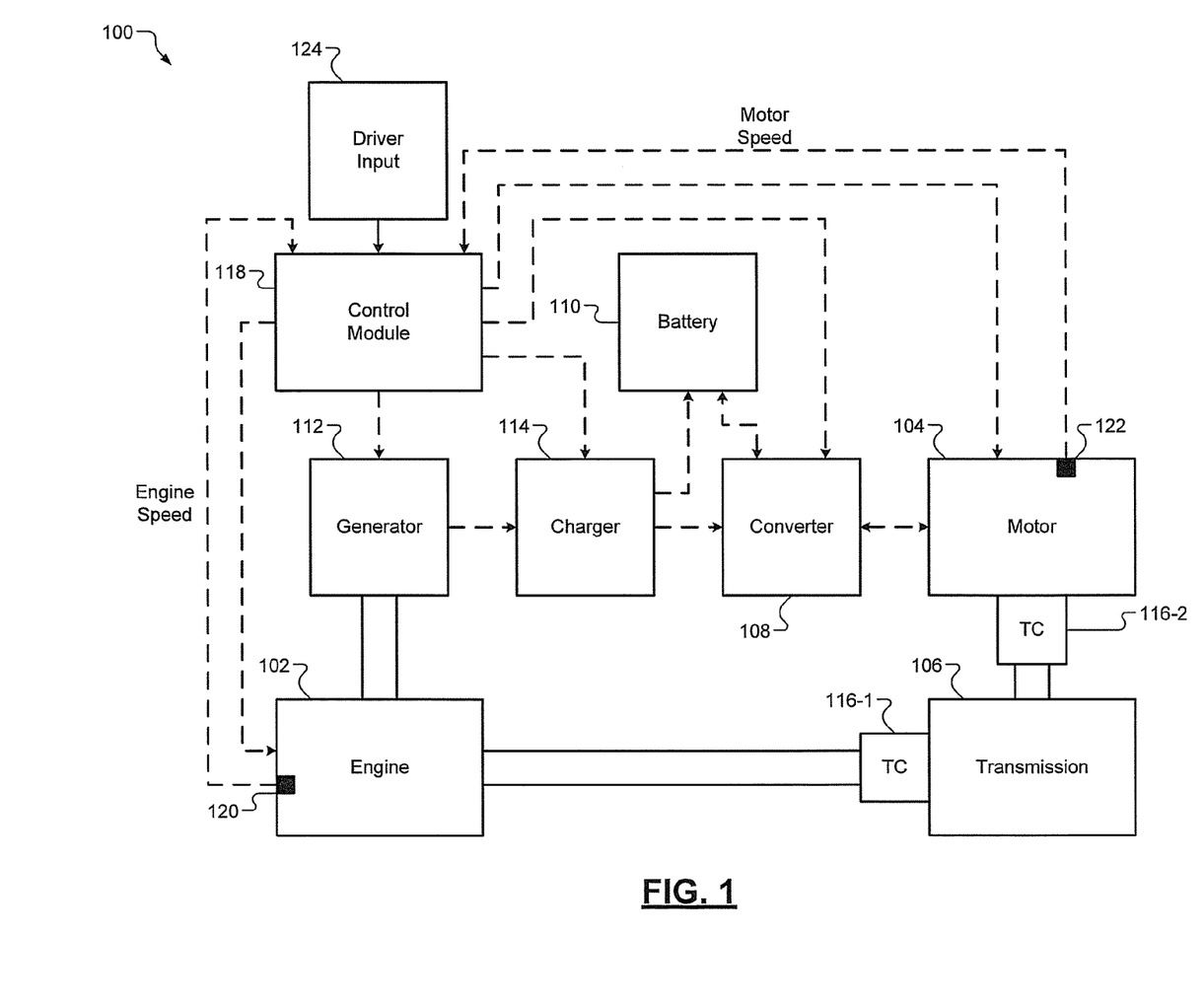
FIG. 1 is a functional block diagram of an exemplary implementation of a hybrid drivetrain of a vehicle according to the principles of the present disclosure.

Referring now to FIG. 1, a functional block diagram of an exemplary implementation of a hybrid drivetrain 100 of a vehicle is shown. As can be appreciated, the hysteresis evaluation methods and systems of the present disclosure may be used in various types of hybrid drivetrains. For exemplary purposes, the hysteresis evaluation methods and systems of the present disclosure will be discussed in the context of a combined hybrid drivetrain. The hybrid drivetrain 100 includes an engine 102, a motor 104, a transmission 106, a converter 108, a battery 110, a generator 112, and a charger 114. The hybrid drivetrain 100 further includes torque converters (TC) 116-1, 116-2 (referred to collectively as TCs 116) and a control module 118.

The engine 102 may output a propulsion torque that is transferred through the TC 116-1 and the transmission 106 to provide an axle torque to drive wheels (not shown) of the vehicle. More specifically, the propulsion torque is multiplied by gear ratios provided by the TC 116-1 and the transmission 106 to provide the axle torque. The transmission 106 may be either a manual or an automatic transmission. For example only, the TCs 116 may each include a clutch.

The motor 104 may be powered by the battery 110 and output a positive torque that is transferred through the TC 116-2 and the transmission 106 to provide the axle torque. More specifically, the positive torque is multiplied by the gear ratios provided by the TC 116-2 and the transmission 106 to provide the axle torque. As can be appreciated, the battery 110 may power accessories of the vehicle in addition to the motor 104. When more torque is desired than the engine 102 is producing, the motor 104 may be used to provide additional torque.

Alternatively, the motor 104 may generate an electrical energy to charge the battery 110. The motor 104 may be driven by the transmission 106. When the engine 102 produces more torque than is required or when more power is desired than the battery 110 is discharging, the motor 104 may be used to charge the battery 110. The converter 108 converts power between the DC voltage of the battery 110 and the electrical energy used or generated by the motor 104.

The engine 102 may drive the generator 112 that generates an electrical energy. The charger 114 receives the electrical energy from the generator 112 and charges the battery 110 and/or powers the motor 104. When large amounts of power are required, the motor 104 may draw electrical energy from both the battery 110 and the charger 114. When large amounts of power are required to charge the battery 110, the battery 110 may draw electrical energy from both the motor 104 and the charger 114.

The control module 118 regulates operation of the hybrid drivetrain 100 based on various drivetrain operating parameters. The control module 118 controls the engine 102, the motor 104, the converter 108, the generator 112, and the charger 114. The control module 118 is in communication with an engine speed sensor 120 that generates an engine speed signal based on the speed of the engine 102.

The control module 118 is further in communication with a motor speed sensor 122 that generates a motor speed signal based on the speed of the motor 104. The control module 118 is further in communication with a driver input 124 that generates an acceleration signal based on an accelerator pedal position of the vehicle. The driver input 124 further generates a velocity signal based on a cruise control system of the vehicle.

Figure 2:
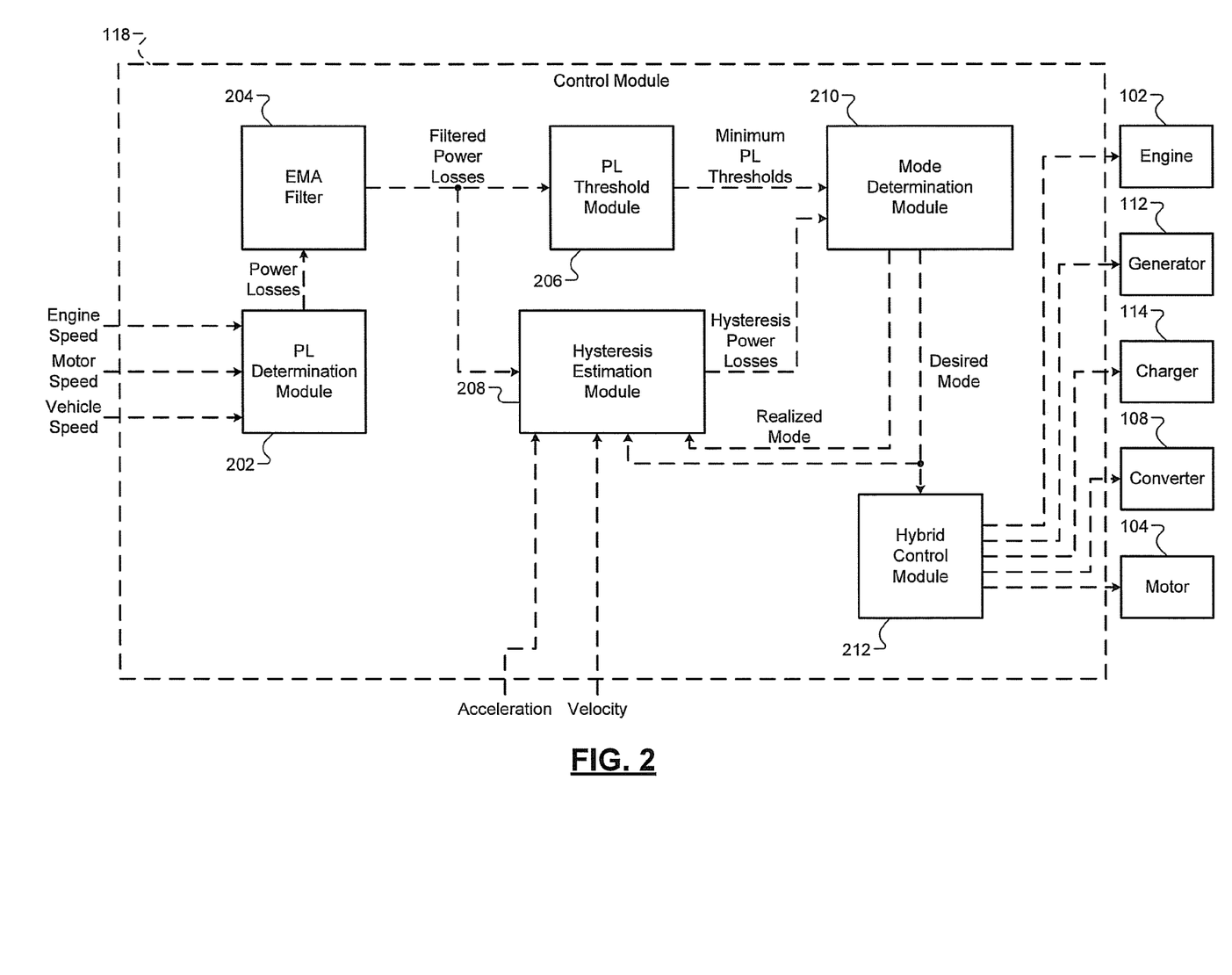
FIG. 2 is a functional block diagram of a control module of the hybrid drivetrain according to the principles of the present disclosure.

Referring now to FIG. 2, a functional block diagram of an exemplary implementation of the control module 118 is shown. The control module 118 includes a power loss (PL) determination module 202, an exponential moving average (EMA) filter 204, and a PL threshold module 206. The control module 118 further includes a hysteresis estimation module 208, a mode determination module 210, and a hybrid control module 212.

The PL determination module 202 receives the engine speed signal from the engine speed sensor 120, the motor speed signal from the motor speed sensor 122, and a vehicle speed signal from a vehicle speed sensor (not shown). The PL determination module 202 determines a power loss signal based on a power loss of the hybrid drivetrain 100 in an operating mode. The power loss is a total amount of power lost by components of the hybrid drivetrain 100 via, for example, friction and/or heat. The power loss signal is determined based on a predetermined table that relates the power loss signal to the engine speed signal, the motor speed signal, and the vehicle speed signal. The PL determination module 202 determines a power loss signal for each operating mode.

The EMA filter 204 receives the power loss signals (i.e., power losses) from and filters the noise of the power loss signals to prevent the hybrid drivetrain 100 from shifting in operation mode due to the noise. Each of the filtered power losses $FPL_t$ is determined according to the following equation:

$$FPL_t = (1-\gamma)PL_t + \gamma FPL_{t-1}, \quad (1)$$

where t is a time period, $\gamma$ is a predetermined damping factor, and $PL_t$ is the corresponding power loss. The EMA filter 204 outputs the filtered power losses to the PL threshold module 206 and the hysteresis estimation module 208.

The PL threshold module 206 receives the filtered power losses and determines a minimum PL threshold based on one of the filtered power losses and a corresponding previous power loss for each of the filtered power losses. The minimum PL threshold is a minimum of subtracting the previous power loss from the filtered power loss. The PL threshold module 206 stores the filtered power loss as the previous power loss cross in local memory. The PL threshold module 206 outputs the minimum PL thresholds to the mode determination module 210.

The hysteresis estimation module 208 receives the filtered power losses and estimates a hysteresis power loss based on a statistical evaluation of one of the filtered power losses for each of the filtered power losses. The hysteresis power loss is a historical (i.e., previous) power loss of the hybrid drivetrain 100 in an operation mode and is initialized to a predetermined value. More specifically, the hysteresis estimation module 208 determines a minimum and an average power loss based on one of the filtered power losses for each of the filtered power losses.

The minimum and the average power losses are initialized to zero. To determine the minimum power loss, the hysteresis estimation module 208 sets the minimum power loss to the smaller value between the filtered power loss and the minimum power loss. The average power loss $PL_{avg}$ is determined according to the following equation:

$$PL_{avg} = \frac{PL_{avg} + FPL}{\text{Length}+1}, \quad (2)$$

where Length is a number of time periods, is initialized to zero, and is incremented by the hysteresis estimation module 208 after determining the average power losses.

The hysteresis estimation module 208 further receives the acceleration signal, the velocity signal, a realized mode from the mode determination module 210, and a desired mode from the mode determination module 210. The realized mode is a current operation mode of the hybrid drivetrain 100. The desired mode is a desired operation mode of the hybrid drivetrain 100. For example only, the realized and the desired modes may each include a mode where both the engine 102 and the motor 104 are outputting torque to the transmission 106.

The hysteresis estimation module 208 determines a hysteresis bandwidth level based on a predetermined table that relates the hysteresis bandwidth level to the acceleration signal, the velocity signal, the realized mode, and the desired mode. The hysteresis bandwidth level includes a high hysteresis level that is a predetermined value and a normal hysteresis level that is a predetermined value that is lower than the high hysteresis level. The hysteresis bandwidth level further includes a low hysteresis level that is a predetermined value that is lower than the normal hysteresis level.

The hysteresis estimation module 208 determines a hysteresis control factor based on the acceleration, the velocity, and the hysteresis bandwidth level. The hysteresis control factor N is determined according to the following equation:

$$N = f(n, a, v, \text{Bandwidth}), \quad (3)$$

where n is a predetermined value, v is the velocity, a is the acceleration, and Bandwidth is the hysteresis bandwidth level. The hysteresis control factor is a function of the velocity because the hysteresis power loss increases with the velocity.

The hysteresis control factor is a function of the acceleration to integrate the fuel efficiency with the drivability of the hybrid drivetrain 100. When the acceleration is greater than zero, the hysteresis control factor is set to a value that results in the hysteresis power loss being closer in value to the minimum power loss. The lower hysteresis power loss allows the hybrid drivetrain 100 to be quickly shifted in operation mode, increasing the fuel efficiency. When the acceleration is less than zero, the hysteresis control factor is set to a value that results in the hysteresis power loss being closer in value to the maximum power loss. The higher hysteresis power loss allows the hybrid drivetrain 100 to be slowly shifted in operation mode, increasing the drivability.

When the hysteresis bandwidth level is set to the high hysteresis level, the hysteresis control factor is set to a value that results in the hysteresis power loss being closer in value to a maximum power loss. When the hysteresis bandwidth level is set to the low hysteresis level, the hysteresis control factor is set to a value that results in the hysteresis power loss being closer in value to the minimum power loss. When the hysteresis bandwidth level is set to the normal hysteresis level, the hysteresis control factor is not affected.

The hysteresis estimation module 208 determines an approximation power loss based on one of the minimum power losses and one of the average power losses for each of the filtered power losses. The approximation power loss $PL_{approx}$ is determined according to the following equation:

$$PL_{approx} = \frac{PL_{avg} - PL_{min}}{4}. \quad (4)$$

The hysteresis estimation module 208 determines the hysteresis power loss based on one of the average power losses, one of the approximation power losses, and the hysteresis control factor for each of the filtered power losses. The hysteresis power loss $PL_{hyst}$ is determined according to the following equation:

$$PL_{hyst} = PL_{avg} + N * PL_{appox}. \quad (5)$$

The mode determination module 210 receives the minimum PL thresholds and the hysteresis power losses. The mode determination module 210 determines the realized mode. The mode determination module 210 determines the desired mode based on the minimum PL thresholds and the hysteresis power losses. When the minimum PL threshold of the realized mode is less than the hysteresis power loss of the realized mode, the mode determination module 210 sets the desired mode to the mode in which the minimum PL threshold of the mode is greater than the hysteresis power loss of the mode.

The hybrid control module 212 receives the desired mode and controls the engine 102, the motor 104, the converter 108, the generator 112, and the charger 114 based on the desired mode. For example only, when the desired mode indicates that both the engine 102 and the motor 104 are to output torque, the hybrid control module 212 may instruct the generator 112 and the charger 114 to be idle. In this operation mode, the hybrid control module 212 may determine how much torque should be produced by the engine 102 and how much torque should be produced by the motor 104.

Figure 3:
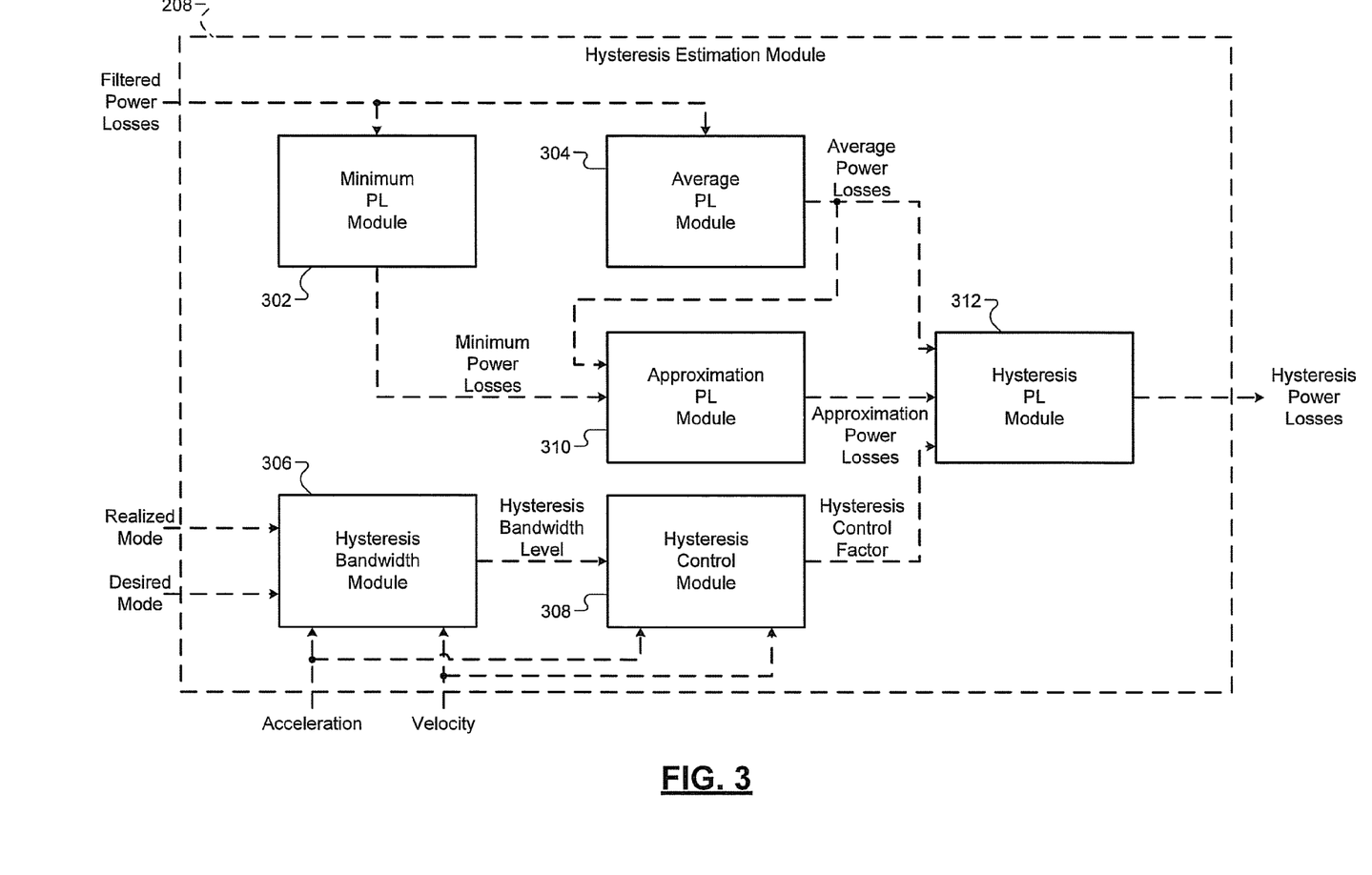
FIG. 3 is a functional block diagram of a hysteresis determination module of the control module according to the principles of the present disclosure.

Referring now to FIG. 3, a functional block diagram of an exemplary implementation of the hysteresis estimation module 208 is presented. The hysteresis estimation module 208 includes a minimum PL module 302, an average PL module 304, a hysteresis bandwidth module 306, and a hysteresis control module 308. The hysteresis estimation module 208 further includes an approximation PL module 310 and a hysteresis PL module 312.

The minimum PL module 302 receives the filtered power losses and determines the minimum power loss based on one of the filtered power losses for each of the filtered power losses. The average PL module 304 receives the filtered power losses and determines the average power loss based on one of the filtered power losses for each of the filtered power losses. In addition, the average PL module 304 increments the length after determining the average power losses.

The hysteresis bandwidth module 306 receives the acceleration signal, the velocity signal, the realized mode, and the desired mode. The hysteresis bandwidth module 306 determines the hysteresis bandwidth level based on the acceleration, the velocity, the realized mode, and the desired mode. The hysteresis control module 308 receives the acceleration signal, the velocity signal, and the hysteresis bandwidth level. The hysteresis control module 308 determines the hysteresis control factor based on the acceleration, the velocity, and the hysteresis bandwidth level.

The approximation PL module 310 receives the minimum and the average power losses. The approximation PL module 310 determines the approximation power loss based on one of the minimum power losses and one of the average power losses for each of the filtered power losses. The hysteresis PL module 312 receives the average and the approximation power losses and the hysteresis control factor. The hysteresis PL module 312 determines the hysteresis power loss based on one of the average power losses, one of the approximation power losses, and the hysteresis control factor for each of the filtered power losses.

Figure 4:
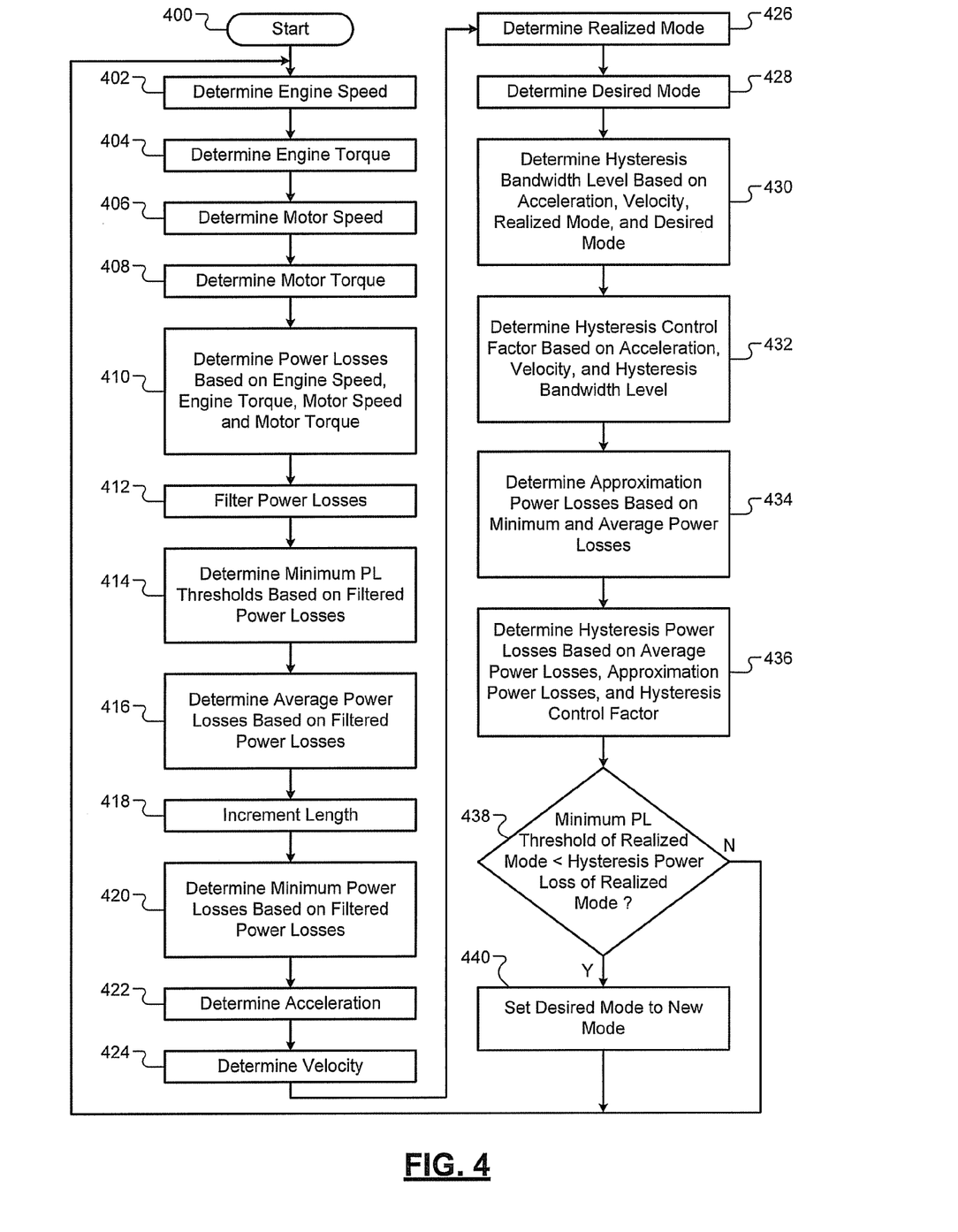
FIG. 4 is a flowchart depicting exemplary steps performed by the control module according to the principles of the present disclosure.

Referring now to FIG. 4, a flowchart depicts exemplary steps performed by the control module 118. Control begins in step 400. In step 402, the engine speed is determined. In step 404, the engine torque is determined. In step 406, the motor speed is determined.

In step 408, the motor torque is determined. In step 410, the power losses are determined based on the engine speed, the engine torque, the motor speed, and the motor torque. In step 412, the power losses are filtered. In step 414, the minimum PL thresholds are determined based on the filtered power losses.

In step 416, the average power losses are determined based on the filtered power losses. In step 418, the length is incremented. In step 420, the minimum power losses are determined based on the filtered power losses. In step 422, the acceleration is determined.

In step 424, the velocity is determined. In 426, the realized mode is determined. In step 428, the desired mode is determined. In step 430, the hysteresis bandwidth level is determined based on the acceleration, the velocity, the realized mode, and the desired mode.

In step 432, the hysteresis control factor is determined based on the acceleration, the velocity, and the hysteresis bandwidth level. In step 434, the approximation power losses are determined based on the minimum and the average power losses. In step 436, the hysteresis power losses are determined based on the average power losses, the approximation power losses, and the hysteresis control factor.

In step 438, control determines whether the minimum PL threshold of the realized mode is less than the hysteresis power loss of the realized mode. If true, control continues in step 440. If false, control returns to step 402. In step 440, the desired mode is set to a new mode. Control returns to step 402.

Figure 5:
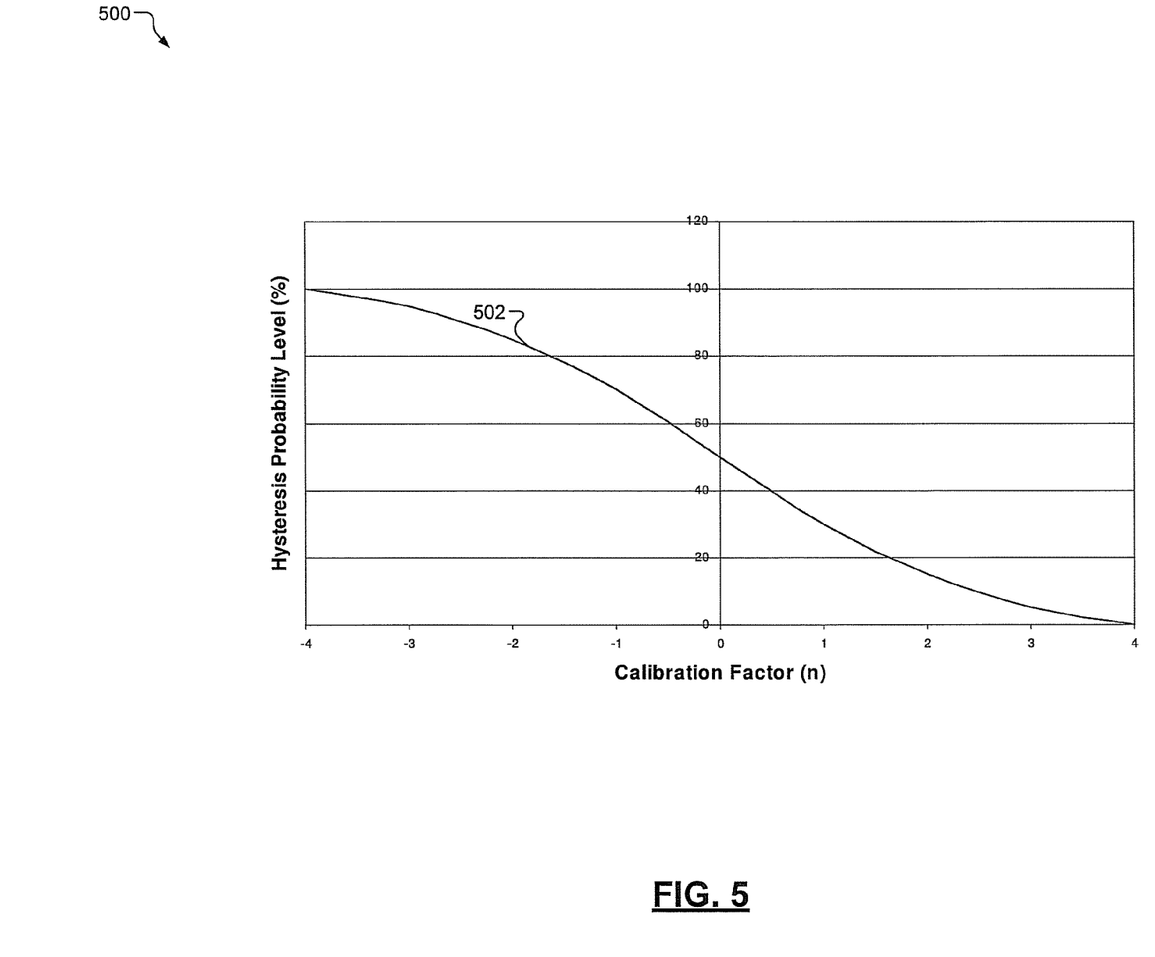
FIG. 5 is an exemplary graph of hysteresis probability level as a function of hysteresis calibration factor according to the principles of the present disclosure.
Figure 6:
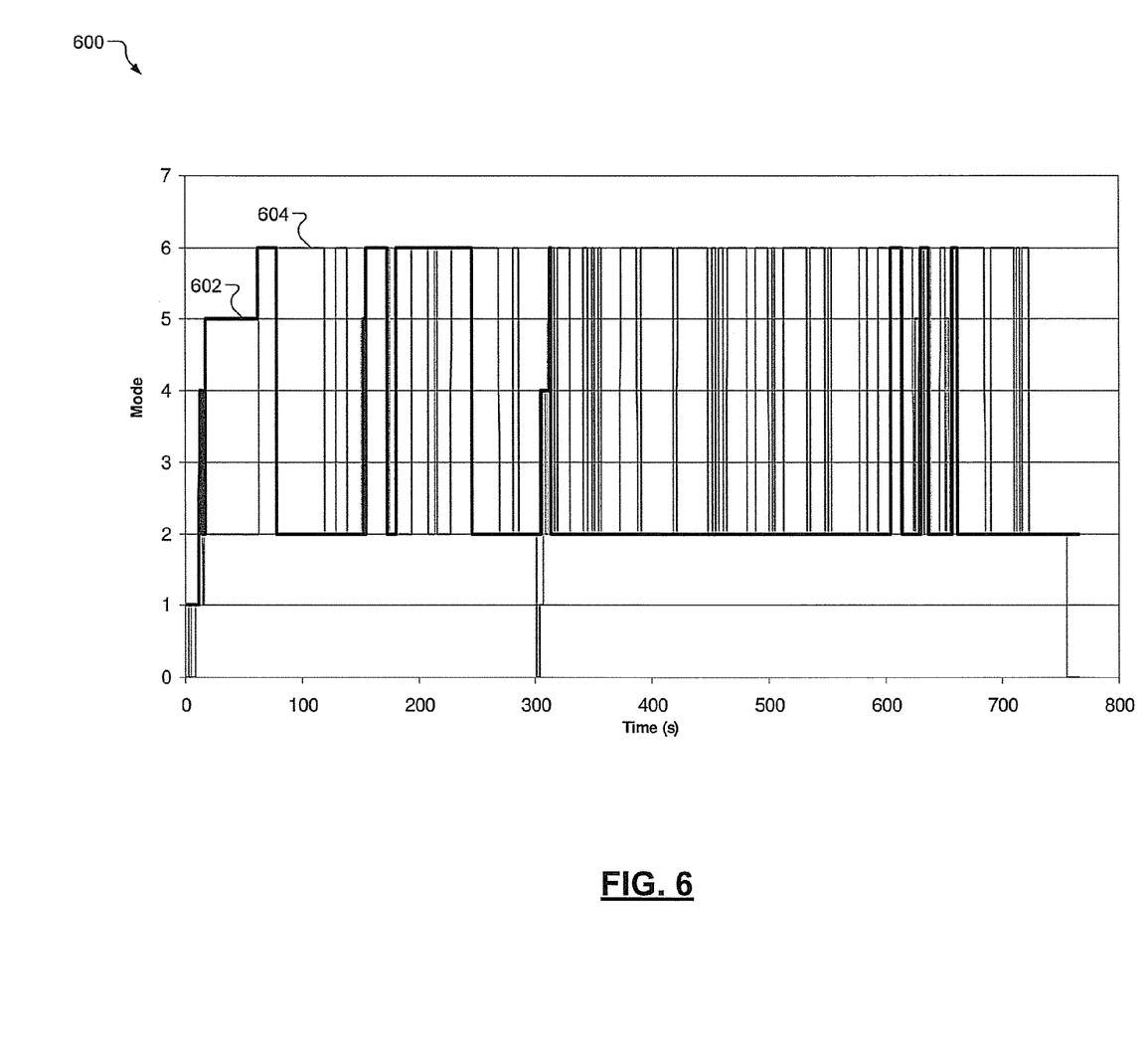
FIG. 6 is an exemplary graph of operation mode of hybrid drivetrains as a function of time according to the principles of the present disclosure.
Figure 7:
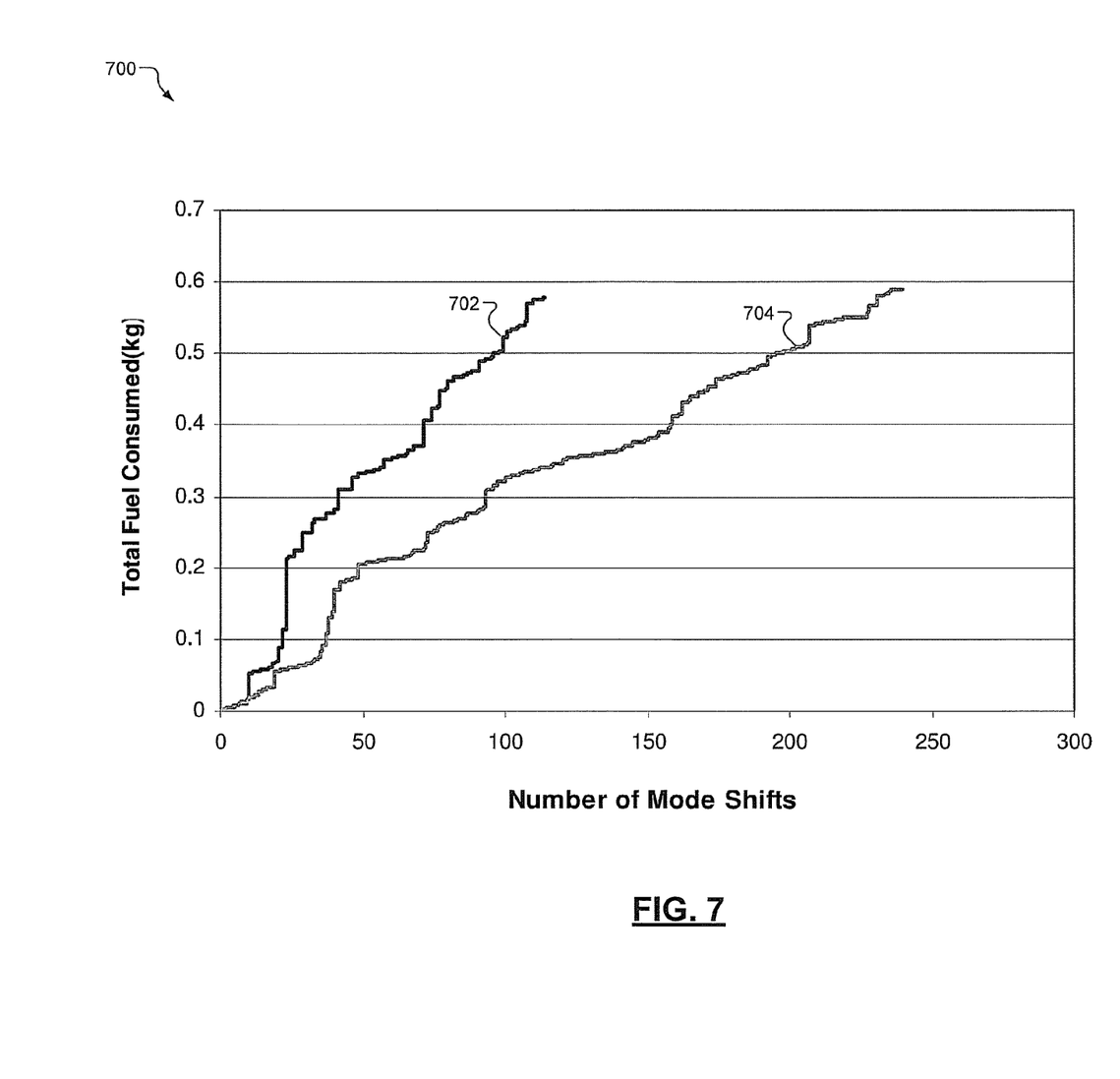
FIG. 7 is an exemplary graph of total fuel consumed by hybrid drivetrains as a function of number of shifts of operation mode of the hybrid drivetrains during a time period according to the principles of the present disclosure.

Referring now to FIGS. 5-7, simulation results using an analytical model are shown. In FIG. 5, an exemplary graph 500 of hysteresis probability level as a function of hysteresis calibration factor is presented. The graph 500 depicts a probability level of the hysteresis power loss allowing the hybrid drivetrain 100 to be shifted in operation mode (i.e., a hysteresis probability level 502). The graph 500 depicts the hysteresis probability level versus the predetermined value of the hysteresis control factor (i.e., a hysteresis calibration factor n). The graph 500 assumes that the hysteresis probability level 502 is a Gaussian distribution.

The hysteresis probability level 502 decreases as the hysteresis calibration factor increases. This is because as the hysteresis calibration factor increases, the hysteresis power loss increases toward the maximum power loss. The higher hysteresis power loss makes it more difficult for the hybrid drivetrain 100 to be shifted in operation mode. The graph 500 shows how the hysteresis evaluation method and system may be easily calibrated by determining the hysteresis calibration factor based on the desired hysteresis probability level 502.

In FIG. 6, an exemplary graph 600 of operation mode of hybrid drivetrains as a function of time is presented. The graph 600 depicts an operation mode of the hybrid drivetrain 100 (i.e., a present disclosure mode 602) versus a time. The graph 600 further depicts an operation mode of a hybrid drivetrain of the prior art (i.e. a prior art mode 604) versus the time. The present disclosure mode 602 is shifted less than the prior art mode 604 over the time. As a result, the hybrid drivetrain 100 has greater drivability than the hybrid drivetrain of the prior art.

In FIG. 7, an exemplary graph 700 of total fuel consumed by hybrid drivetrains as a function of number of shifts of operation mode of the hybrid drivetrains during a time period is presented. The graph 700 depicts a total fuel consumed by the hybrid drivetrain 100 (i.e., a present disclosure fuel 702) during the time period. The graph 700 depicts the present disclosure fuel 702 versus a number of shifts of an operation mode of the hybrid drivetrain 100 during the time period. The graph 700 further depicts a total fuel consumed by a hybrid drivetrain of the prior art (i.e., a prior art fuel 704) during the time period. The graph 700 depicts the prior art fuel 704 versus a number of shifts of an operation mode of the hybrid drivetrain of the prior art during the time period.

The present disclosure fuel 702 is less than the prior art fuel 704 during the time period. As a result, simulation results support the belief that the hybrid drivetrain 100 will have greater fuel economy than the hybrid drivetrain of the prior art. The number of shifts of the operation mode of the hybrid drivetrain 100 is expected to be less than the number of shifts of the operation mode of the hybrid drivetrain of the prior art during the time period. As a result, the hybrid drivetrain 100 is expected to have greater drivability than the hybrid drivetrain of the prior art.

|  | Prior Art | Present Disclosure | Difference (%) |
| --- | --- | --- | --- |
| Fuel Economy (mpg) | 35.4 | 36.2 | +2.3 |
| DFCO Events | 242 | 396 | +63.6 |
| Engine Starts and Stops | 62 | 36 | −41.9 |
| Engine Off (%) | 51.5 | 49.4 | −4.1 |

An exemplary table of the expected benefits of the present disclosure is shown above. The fuel economy of the present disclosure is expected to increase by 2.3 percent in comparison to the fuel economy of the prior art. The number of deceleration fuel cut-off (DFCO) events of the present disclosure is expected to increase by 63.6 percent in comparison to the prior art. In a vehicle, a DFCO event is a fuel-saving event whereby the fuel injectors are turned off when the throttle is closed, and the engine is driven by the momentum of the vehicle.

In comparison to the prior art, the number of engine starts and stops of the present disclosure is expected to decrease by 41.9 percent. In comparison to the prior art, the percentage of the engine 102 being off is expected to decrease by 4.1 percent. As a result, the present disclosure has better drivability than the prior art.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A hybrid control system, comprising:
a power loss (PL) determination module that determines a power loss of a hybrid drivetrain based on an engine speed, a motor speed, and a vehicle speed;
a hysteresis estimation module that determines an average power loss of the hybrid drivetrain based on the power loss and that determines a hysteresis power loss of the hybrid drivetrain based on the average power loss; and a mode determination module that selects an operation mode of the hybrid drivetrain based on the hysteresis power loss, wherein the hybrid control system controls the hybrid drivetrain based on the operation mode.

2. The hybrid control system of claim 1 further comprising an exponential moving average (EMA) filter that filters a noise of a signal of the power loss.

3. The hybrid control system of claim 1 further comprising a power loss (PL) threshold module that determines a power loss threshold based on the power loss.

4. The hybrid control system of claim 3 wherein the mode determination module sets the operation mode to a new mode when the power loss threshold is less than the hysteresis power loss.

5. The hybrid control system of claim 1 wherein the hysteresis estimation module further comprises a minimum PL module that determines a minimum power loss of the hybrid drivetrain based on the power loss.

6. The hybrid control system of claim 5 wherein the hysteresis estimation module further comprises an average PL module that determines the average power loss based on the power loss.

7. The hybrid control system of claim 6 wherein the hysteresis estimation module further comprises a hysteresis bandwidth module that determines a hysteresis bandwidth level based on an acceleration of a vehicle, a velocity of the vehicle, a current operation mode of the hybrid drivetrain, and the operation mode.

8. The hybrid control system of claim 7 wherein the hysteresis estimation module further comprises a hysteresis control module that determines a hysteresis control factor based on the acceleration, the velocity, and the hysteresis bandwidth level.

9. The hybrid control system of claim 8 wherein the hysteresis estimation module further comprises an approximation PL module that determines an approximation power loss of the hybrid drivetrain based on the minimum and the average power losses.

10. The hybrid control system of claim 9 wherein the hysteresis estimation module further comprises a hysteresis PL module that determines the hysteresis power loss based on the average power loss, the approximation power loss, and the hysteresis control factor.

11. A method of operating a hybrid control system, comprising:

determining a power loss of a hybrid drivetrain based on an engine speed, a motor speed, and a vehicle speed;

determining an average power loss of the hybrid drivetrain based on the power loss;

determining a hysteresis power loss of the hybrid drivetrain based on the average power loss;

selecting an operation mode of the hybrid drivetrain based on the hysteresis power loss; and controlling the hybrid drivetrain based on the operation mode.

12. The method of claim 11 further comprising filtering a noise of a signal of the power loss.

13. The method of claim 11 further comprising determining a power loss threshold based on the power loss.

14. The method of claim 13 further comprising setting the operation mode to a new mode when the power loss threshold is less than the hysteresis power loss.

15. The method of claim 11 further comprising determining a minimum power loss of the hybrid drivetrain based on the power loss.

16. The method of claim 15 further comprising determining a hysteresis bandwidth level based on an acceleration of a vehicle, a velocity of the vehicle, a current operation mode of the hybrid drivetrain, and the operation mode.

17. The method of claim 16 further comprising determining a hysteresis control factor based on the acceleration, the velocity, and the hysteresis bandwidth level.

18. The method of claim 17 further comprising determining an approximation power loss of the hybrid drivetrain based on the minimum and the average power losses.

19. The method of claim 18 further comprising determining the hysteresis power loss based on the average power loss, the approximation power loss, and the hysteresis control factor.

* * * * *